(12) United States Patent
Ogawa

(10) Patent No.: US 7,766,060 B2
(45) Date of Patent: Aug. 3, 2010

(54) TIRE AND TIRE PRODUCING METHOD

(75) Inventor: Yuichiro Ogawa, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 402 days.

(21) Appl. No.: 10/564,733

(22) PCT Filed: Jul. 14, 2004

(86) PCT No.: PCT/JP2004/010034

§ 371 (c)(1),
(2), (4) Date: Jan. 17, 2006

(87) PCT Pub. No.: WO2005/007424

PCT Pub. Date: Jan. 27, 2005

(65) Prior Publication Data

US 2006/0174986 A1   Aug. 10, 2006

(30) Foreign Application Priority Data

Jul. 16, 2003   (JP) ............................. 2003-197888

(51) Int. Cl.
*B29D 30/60* (2006.01)
*B60C 1/00* (2006.01)
*B60C 11/00* (2006.01)

(52) U.S. Cl. ........... 152/152.1; 152/209.5; 152/DIG. 2; 156/117; 156/130

(58) Field of Classification Search ............... 152/152.1, 152/209.5, DIG. 2; 156/117, 128.6, 130, 156/397

See application file for complete search history.

(56) References Cited

U.S. PATENT DOCUMENTS 2,339,546 A * 1/1944 Hanson .................... 152/152.1

| 6,202,724 | B1 * | 3/2001 | Hiruma et al. ......... 152/DIG. 2 |
| 6,834,693 | B1 * | 12/2004 | Calvar et al. .......... 152/DIG. 2 |
| 6,951,233 | B1 * | 10/2005 | Calvar et al. .......... 152/DIG. 2 |
| 2001/0035255 | A1 * | 11/2001 | Sergel et al. ................ 156/130 |
| 2002/0007893 | A1 * | 1/2002 | Koyama et al. ............. 156/123 |

FOREIGN PATENT DOCUMENTS

| EP | 1201397 | * | 5/2002 |
| JP | 10-323917 | | 12/1998 |
| JP | 11-020426 | * | 1/1999 |
| JP | 11-129713 | * | 5/1999 |
| JP | 11-151907 | | 6/1999 |

(Continued)

*Primary Examiner*—Steven D Maki
(74) *Attorney, Agent, or Firm*—Sughrue Mion, PLLC

(57) ABSTRACT

A tire comprising a tread layer comprised of a tread rubber and an electrically conductive band arranged in a widthwise middle portion thereof, and a method of producing the tire, wherein the tread rubber is made of a low-conductive continuous rubber ribbon circumferentially wound plural times, and the electrically conductive band is made of a high-conductive thin annular rubber sheet. Also, the electrically conductive band is arranged so as to extend in the widthwise region ranging from a part of the top face of the first tread rubber portion to a part of the bottom face of the second tread rubber portion, whereby the tire uniformity is improved and the production is possible in a multi-size mixed production system and the conductive path from the belt to the treading face can be surely formed at a low cost.

7 Claims, 6 Drawing Sheets

FOREIGN PATENT DOCUMENTS

| | | | |
|---|---|---|---|
| JP | 11-227415 | | 8/1999 |
| JP | 2000-313072 | | 11/2000 |
| JP | 2001-047525 | * | 2/2001 |
| JP | 2003-326614 | * | 11/2003 |
| JP | 2004-136808 | | 5/2004 |
| WO | WO 98/38050 | * | 9/1998 |

* cited by examiner (a)

(b)

(c)

TIRE AND TIRE PRODUCING METHOD

TECHNICAL FIELD

This invention relates to a tire capable of sufficiently discharging static electricity generated in a vehicle toward a road surface while reducing the rolling resistance of the tire and a method of producing the same.

BACKGROUND ART

In order to reduce the rolling resistance of the tire, a greater part of carbon black compounded in a tread rubber tends to be positively replaced with silica having a low hysteresis characteristic. However, a tread rubber compounded with a great amount of silica becomes higher in the value of electric resistance, and hence there is caused a problem that static electricity generated in a vehicle hardly discharge through the tire toward a road surface.

For the purpose of ensuring the discharge property of the tread rubber is proposed a tire wherein a tread is constructed with at least one tread layer comprising a tread rubber having a low electric conduction and an electrically conductive band arranged in a widthwise middle portion of such a tread rubber and constituting at least a part of a conductive path from a belt to a treading face of the tread. A first proposal is a tire wherein each of the tread rubber and the electrically conductive band constituting the tread layer is made from an annular rubber member of one-piece structure (see JP-A-11-151907), and a second proposal is a tire wherein each of the tread rubber and the electrically conductive band constituting the tread layer is made from a rubber ribbon wound plural times in a circumferential direction of the tread (see JP-A-2000-96402).

However, these proposals have the following problems. As to the first proposal, the tread rubber is naturally formed by winding an elongate rubber extruded through an orifice corresponding to a shape of a tire product on a full periphery of a tire once, so that the thus formed tread rubber has a joint portion at one place of the periphery, which is a cause of deteriorating the tire uniformity. Also, the formation of such a tread rubber needs a large-size extruder but also the orifice set in the extruder once can not be easily exchanged with another new orifice, so that there is a drawback that this proposal can not be applied to an efficient system of mixedly producing tires of various sizes while reducing intermediate stock.

The problem of the second proposal is as follows. The material of the electrically conductive band is different from that of the tread rubber naturally optimized toward the function inherent to the tread, and hence it is preferable to become thin as far as a thickness in the widthwise direction of the tire enough to guarantee the electric conduction is ensured. However, the electrically conductive band of the second proposal has a problem that the band has a structure of winding and laminating a continuous uncured conductive rubber ribbon and the thickness becomes considerably thicker than the naturally required thickness.

Furthermore, at least one of upper face and lower face in the tread layer is an adjacent face adjoining to the other tire constituting layer inward or outward in the radial direction, so that the electrically conductive band is exposed to the adjacent face over the full periphery and is necessary to surely hold the contact with an electrically conductive portion of the adjoining tire constituting layer. In the first and second proposals, however, the electrically conductive band is exposed to the adjacent face as only a narrow-width line, and in this case, a portion not exposing to the adjacent face may be caused due to the scattering in the production. Also, when two of the tread layers having the above structure are laminated, the exposing portions of the electrically conductive bands are not matched with each other in the widthwise direction or it is difficult to ensure the electric conduction among these layers. If it is intended to control the scattering in the production for preventing this drawback, a production equipment of a high precision is required and hence there is caused a problem rendering a significant cost-up.

DISCLOSURE OF THE INVENTION

The invention is made considering the above problems and is to provide a tire in which the tire uniformity is improved in the tire comprising a tread layer consisting of a tread rubber and an electrically conductive band arranged in a widthwise middle portion thereof and the production is possible in a multi-size mixed production system and the widthwise thickness of the electrically conductive band can be controlled at minimum and a conductive path from a belt to a treading face can be surely formed in a low cost as well as a method of producing such a tire.

The invention is accomplished for achieving the above object, and the summary, construction and function are as follows.

<1> A tire comprising at least one tread layer consisting of a tread rubber made of a low-conductive rubber and an electrically conductive band arranged in widthwise middle portion of the tread rubber and constituting at least a part of a conductive path from a belt to a treading face of a tread in which the tread rubber is made of a low-conductive continuous rubber ribbon circumferentially wound plural times, and the electrically conductive band is made of a high-conductive thin annular rubber sheet.

According to the item <1>, the tread rubber is constructed by the low-conductive continuous rubber ribbon circumferentially wound plural times, so that there is no joint portion extending over the full width of the tread rubber and the uniformity can be improved. Also, tread rubbers having various sectional shapes can be formed by controlling the winding arrangement of the same rubber ribbon and it is possible to conduct the production in a multi-size mixed production system. Further, according to this tire, the electrically conductive band is constructed by the high-conductive thin annular rubber sheet, so that the thickness of the sheet is made to a minimum level enough to act as the electrically conductive band, whereby the bad influence on the function inherent to the tread rubber can be controlled to a minimum level.

<2> A tire comprising at least one tread layer consisting of a tread rubber made of a low-conductive rubber and an electrically conductive band arranged in widthwise middle portion of the tread rubber and constituting at least a part of a conductive path from a belt to a treading face of a tread in which a first tread rubber portion of the tread rubber separated by the electrically conductive band is arranged so as to orient a side face thereof contacting with the electrically conductive band outward in the radial direction, and the electrically conductive band is made of a high-conductive thin annular rubber sheet and connected to both ends of the side face in the radial direction so as to extend over a widthwise region ranging from a part of a top face of the first tread rubber portion toward a part of a bottom face of a second tread rubber portion separated by the electrically conductive band.

According to the item <2>, since the electrically conductive band is made of a high-conductive thin annular rubber sheet, the thickness of the sheet is made to a minimum level enough to act as the electrically conductive band, whereby the bad influence on the function inherent to the tread rubber can be controlled to a minimum level. Also, the electrically conductive band is extended over the widthwise region ranging from the top face of the first tread rubber portion toward the bottom face of the second tread rubber portion, so that even if the position of the electrically conductive band in the widthwise direction is somewhat changed due to the scattering in the production, the electric contact with an electrically conductive portion of the adjoining tire constituting layer can be ensured, and hence a tire capable of holding the conductive path from the belt to the treading face can be provided cheaply.

Furthermore, the side face of the first tread rubber portion in the tire contacting with the electrically conductive band is oriented outward in the radial direction, so that it is easy to form the uncured electrically conductive band by winding the uncured conductive thin rubber sheet.

<3> A tire according to the item <2>, wherein the tread rubber is made of a low-conductive continuous rubber ribbon circumferentially wound plural times.

According to the item <3>, the electric conduction can be ensured at a low cost but also since the tread rubber is made of the low-conductive continuous rubber ribbon circumferentially wound plural times, the high uniformity level can be provided as previously mentioned and the production in the multi-size mixed production system becomes possible.

<4> A tire according to the item <2> or <3>, wherein the side face of the first tread rubber portion contacting with the electrically conductive band has an average inclination angle of 45-75° with respect to an equatorial plane of the tire.

When the average inclination angle of the side face of the first tread rubber portion with respect to the equatorial plane is less than 45°, it becomes difficult to wind the uncured conductive thin rubber sheet, while when it exceeds 75°, the extending range of the electrically conductive band in the widthwise direction becomes wider, which causes a possibility of obstructing the performances inherent to the tread rubber.

<5> A tire according to any one of the items <2> to <4>, wherein the tread layer is arranged as at least innermost layer in the radial direction.

The electrically conductive band in the radially innermost tread layer is required to hold the electric continuity with the tread under cushion or belt adjoining thereto inward in the radial direction, so that according to the item <5>, the electrically conductive band in the innermost tread layer is extended to the widthwise range ranging to the bottom face of the second tread rubber portion and can ensure the electric continuity with such a portion.

<6> A tire according to any one of the items <1> to <5>, wherein at least two layers as the tread layer are arranged adjacent to each other inside and outside in the radial direction and the electrically conductive bands in these tread layers are contacted with each other over the full periphery.

When the tread is comprised of two or more tread layers, it is important to surely hold the electric continuity between the electrically conductive bands in the tread layers adjoining to each other inside and outside in the radial direction. According to the item <6>, the electrically conductive band in the tread layer located inside in the radial direction is extended to the widthwise region ranging to the top face of the first tread rubber portion, and the electrically conductive band in the tread layer located outside in the radial direction is extended to the widthwise region ranging to the bottom face of the second tread rubber portion, so that the electric continuity between these electrically conductive bands can be ensured by allowing the fluctuation based on the scattering of the electrically conductive bands in these tread layers in the widthwise direction.

<7> A method of producing a tire as described in any one of the items <1> to <6>, which comprises winding a thin high-conductive uncured rubber sheet on an outer periphery of a rotating, displacing tire raw member one time to form an uncured electrically conductive band.

There are proposed some methods for the formation of the uncured electrically conductive band made of the high-conductive thin annular rubber sheet. For example, there is a method wherein an integrally united elongate of a tread rubber and an electrically conductive band formed by integrally extruding rubber for an electrically conductive band portion and the tread rubber or by applying a conductive rubber cement to a side face of an extruded elongate tread rubber is wound on the tire raw member at a building step to form the uncured electrically conductive band. This method assumes the extrusion of the tread rubber having a sectional shape corresponding to a shape of a product, and hence needs a large-size extruder as previously mentioned and can not solve problems that the deterioration of the uniformity resulted from the joint portion in the circumferential direction can not be prevented and the production is impossible in the multi-size mixed production system.

Also, the other proposal is a method wherein uncured shaped bodies of the tread rubber to be arranged on both widthwise sides of the electrically conductive band are formed on the rotating tire raw member and a cement is poured therebetween to form an uncured electrically conductive band. This method takes a long time for drying the cement and has a problem that the productivity is largely damaged.

According to the item <7>, the uncured electrically conductive band is formed by winding a thin high-conductive uncured rubber sheet on an outer periphery of a rotating, displacing tire raw member one time, so that the problems of the above proposals can be solved. Also, the thickness of the electrically conductive band in the widthwise direction can be optimized by adjusting the thickness of the sheet to be wound. Furthermore, the width of the sheet to be wound is adjusted to form the electrically conductive band exceeding the side face of the tread rubber and widely exposing on the top face and bottom face of the tread layer, whereby the electric continuity between the layers can be ensured.

<8> A method of producing a tire as described in any one of the items <1> to <6>, which comprises circumferentially winding a continuous low-conductive uncured rubber ribbon plural times to form an uncured tread rubber.

According to the item <8>, the uncured tread rubber is formed by circumferentially winding a continuous low-conductive uncured rubber ribbon plural times, so that the tread rubber can be formed by circumferentially winding the low-conductive continuous rubber ribbon plural times, and hence the large-size extruder is useless as previously mentioned and the deterioration of the uniformity due to the joint portion on the periphery can be prevented and the production is possible in the multi-size mixed production system.

<9> A method according to the item <8>, wherein an uncured first tread rubber portion is formed on the outer periphery of the rotating, displacing tire raw member by circumferentially winding a continuous low-conductive uncured rubber ribbon plural times, and then an uncured electrically conductive band is formed by winding a high-conductive uncured rubber sheet on a widthwise region inclusive of a side face of the uncured first tread rubber portion one time, and thereafter uncured second tread rubber portion is formed on outer peripheries of the rotating, displacing electrically conductive band and tire raw member by circumferentially winding a continuous low-conductive uncured rubber ribbon plural times.

According to the item <9>, after the uncured first tread rubber portion is formed on the outer periphery of the tire raw member, the high-conductive uncured rubber sheet is wound on the outer periphery of the side face of this tread rubber portion orienting outward in the radial direction, so that the winding of this sheet can be made easy. Also, the winding of the high-conductive rubber sheet is carried out before the formation of the second tread rubber portion, so that the high-conductive uncured rubber sheet can be wound so as to extend over the widthwise region ranging from the top face of the first tread rubber portion through the side face of the first tread rubber portion to the bottom face of the second tread rubber portion, and hence the electric continuity between the layers can be ensured.

<10> A method according to the item <7> or <9>, wherein the high-conductive uncured rubber sheet is formed by rolling in a calendar.

According to the item <10>, the high-conductive, uncured rubber sheet is formed by rolling in the calendar, so that an elongate sheet having a very thin thickness can be formed as compared with the case of extruding the sheet through a given orifice, and hence the thickness of the electrically conductive band in the widthwise direction can be optimized.

BEST MODE FOR CARRYING OUT THE INVENTION

Figure 1:
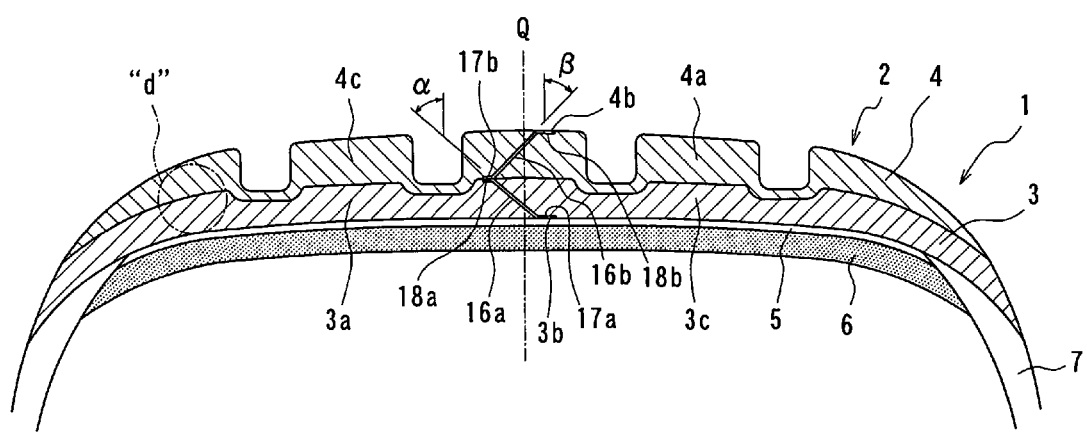
FIG. 1 is a meridianal section view illustrating a tread portion of a tire in an embodiment of the invention.
Figure 2:
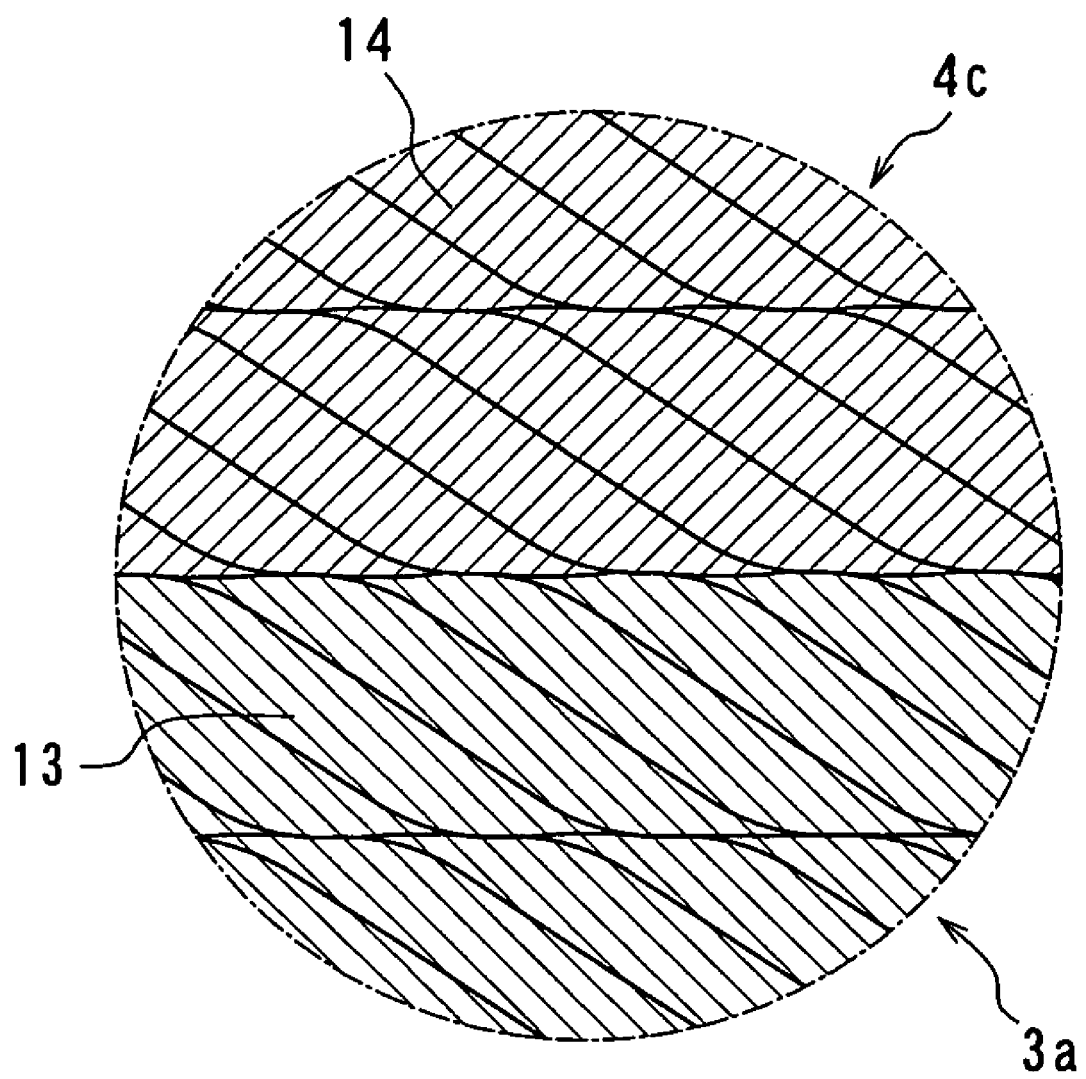
FIG. 2 is a section view illustrating a detail of a portion "d" in FIG. 1.

An embodiment of the invention will be described with reference to FIGS. 1-6. FIG. 1 is a meridianal section view showing a tread portion of a tire according to an embodiment of the invention, and FIG. 2 is a section view showing a detail of a portion "d" in FIG. 1. The tire 1 comprises a belt 6, a tread under cushion 5 arranged on an outer periphery 9 of the belt 6 and sidewall portions 7 disposed on both sides thereof in the widthwise direction, in which a base tread layer 3 and a cap tread layer 4 disposed outside thereof are arranged outward in the radial direction thereof as a tread layer constituting a tread 2. The base tread layer 3 comprises a first tread rubber portion 3a and a second tread rubber portion 3c having a low electric conduction, and an electrically conductive band 3b having a high electric conduction and arranged in a middle portion of the tread rubber in a widthwise direction of the tire, in which each of the first and second tread rubber portions 3a, 3c is made of a low-conductive continuous rubber ribbon 13 circumferentially wound plural times, and the electrically conductive band 3b is made of a high-conductive thin annular rubber sheet.

Similarly, the cap tread layer 4 comprises a first tread rubber portion 4a and a second tread rubber portion 4c having a low electric conduction, and an electrically conductive band 4b having a high electric conduction and arranged in a middle portion of the tread rubber in a widthwise direction of the tire, in which each of the first and second tread rubber portions 4a, 4c is made of a low-conductive continuous rubber ribbon 14 circumferentially wound plural times, and the electrically conductive band 4b is made of a high-conductive thin annular rubber sheet.

Each of the sidewall 7 and the belt 6 is made of a high-conductive rubber material, while the tread under cushion 5 made of a conductive rubber material, the electrically conductive band 3b in the base tread layer and the electrically conductive band 4b in the cap tread layer 4 are contacted with each other in a region ranging from the belt 6 to a treading face F to form a conductive path, whereby a conductive path is surely formed from a wheel to be mounted with the tire 1 to the treading face F, so that even if the tire is stopped at any rotating position, static electricity generated in a part of a vehicle can be discharged from the treading face F through a vehicle body, a wheel shaft to be mounted with the tire 1, and a wheel to the road surface.

In the first tread rubber portion 3a of the base tread layer 3, a side face 16a contacting with the electrically conductive band 3b is formed so as to orient outward in the radial direction and an inclination angle α thereof with respect to an equatorial plane Q is 45-75°. The electrically conductive band 3b is connected to both ends of the side face 16a in the radial direction so as to extend over a widthwise region ranging from a part of a top face 18a of the first tread rubber portion 3a toward a part of a bottom face 17a of the second tread rubber portion 3c. Similarly, in the first tread rubber portion 4a of the cap tread layer 4, a side face 16b contacting with the electrically conductive band 4b is formed so as to orient outward in the radial direction and an inclination angle β thereof with respect to the equatorial plane Q is 45-75°. The electrically conductive band 4b is connected to both ends of the side face 16b in the radial direction so as to extend over a widthwise region ranging from a part of a top face 18b of the first tread rubber portion 4a toward a part of a bottom face 17b of the second tread rubber portion 4c. Thus, even if the positions of the electrically conductive bands 3b, 4b in the widthwise direction are shifted with each other due to the scattering in the production, the electric continuity between these tread layers or to the tread under cushion 5 can be ensured.

The low-conductive continuous rubber ribbon 13 constituting the tread rubber has a width of 5-30 mm and a thickness of about 0.3-3.0 mm, while the high-conductive thin annular rubber sheet constituting the electrically conductive band 3b, 4b has a volume resistance at 25° C. of not more than $10^6 \Omega \cdot cm$ and preferably has a thickness of 0.3-2.0 mm.

Figure 3:
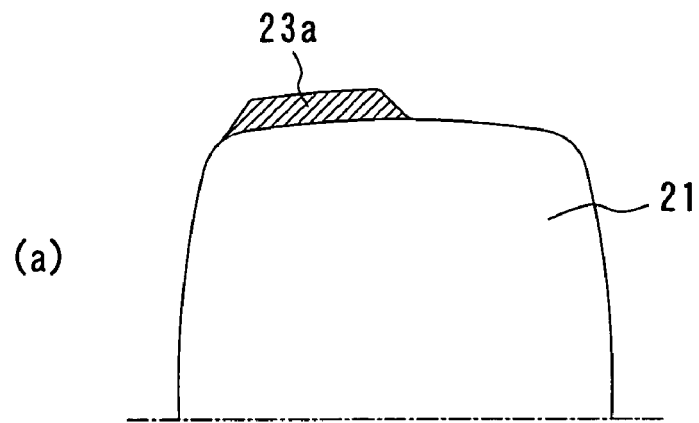
FIG. 3 is a schematic section view of a green tire on the way of the formation explaining a method of forming a tread layer.
Figure 3:
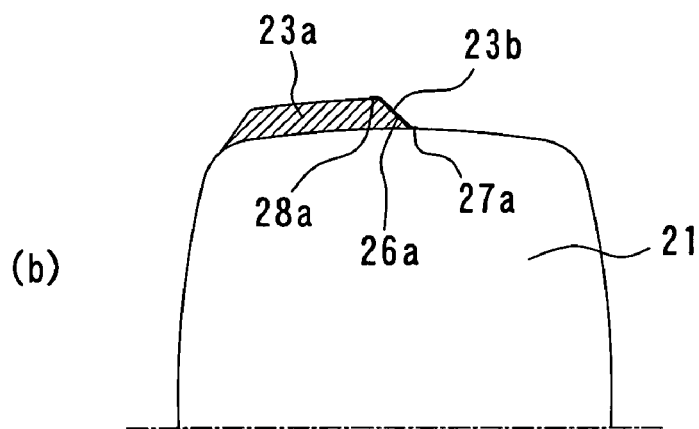
Figure 3:
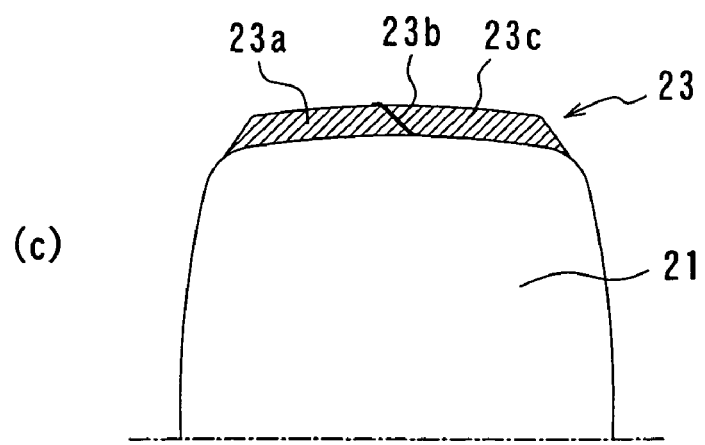
Figure 4:
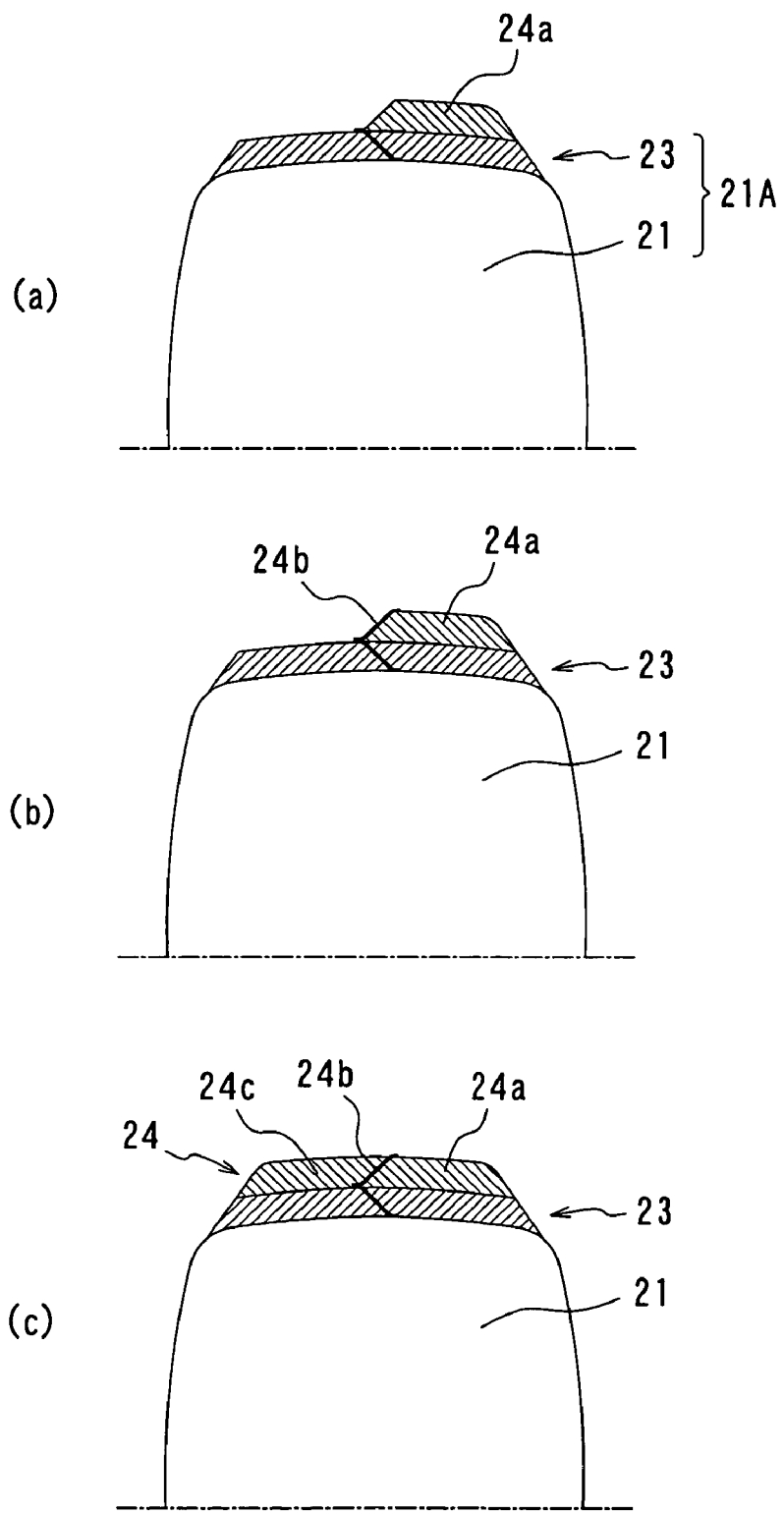
FIG. 4 is a schematic section view explaining step followed by FIG. 3.
Figure 5:
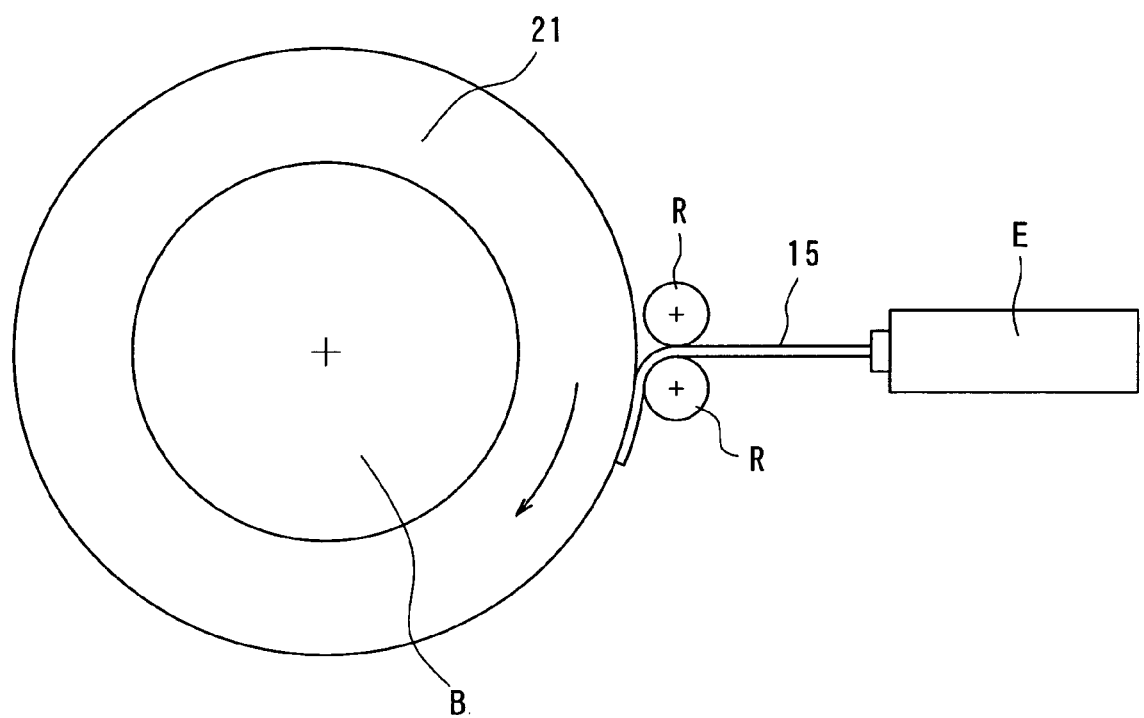
FIG. 5 is a schematic view showing a method of producing an uncured tread rubber.
Figure 6:
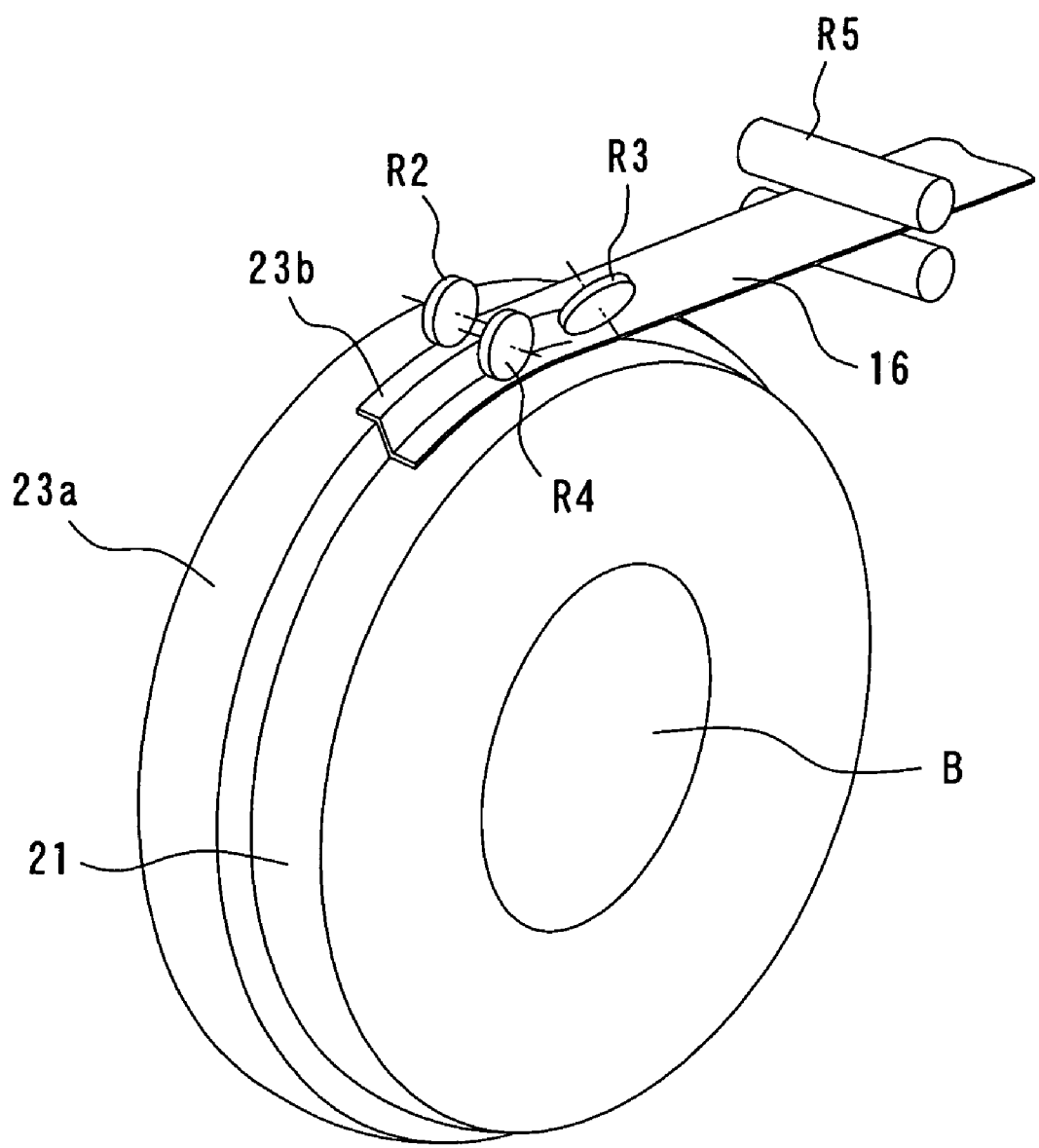
FIG. 6 is a schematic view showing a method of producing an uncured electrically conductive band.

Next, the production method of the tire will be described. The tire 1 shown in FIG. 1 can be obtained by vulcanizing an uncured green tire. The method of forming the uncured tread layer in the green tire is explained with reference to FIGS. 3-6. FIGS. 3 and 4 are schematic section views of the green tire explaining the formation of the tread layer along the formation process, FIG. 5 is a schematic view showing the method of forming the uncured tread rubber, and FIG. 6 is a schematic view showing the method of forming the uncured electrically conductive band.

As shown in FIG. 3(a), an uncured first tread rubber portion 23a constituting an uncured base tread layer 23 is firstly formed on a periphery of a tire raw member 21 previously attached on a building drum B and comprising uncured bead material, carcass material, innerliner material, belt material and tread under cushion material. In the formation of the uncured first tread rubber portion 23a, as shown in FIG. 5, an uncured continuous rubber ribbon 15 extruded through an extruder E is pushed on the tire raw member 21 previously formed on the building drum B through rolls R while rotating the tire raw member 21 and wound therearound plural times.

Then, as shown in FIG. 3(b), the uncured electrically conductive band 23b is formed on the outer periphery of the tire raw member over a widthwise region ranging from a part of the top face 28a of the uncured first tread rubber portion 23a through the side face 26a of the uncured first tread rubber portion 23a to the outer peripheral face 27a of the tire raw member 21 connecting to the side face 26a. As shown in FIG. 6, the uncured electrically conductive band 26b is formed by winding an elongate thin high-conductive uncured rubber sheet 16 guided through guide rolls R5 on the outer peripheral faces of the uncured first tread rubber portion 23a and the tire raw member 21 one time. In this case, since the outer peripheral surface comprised of the uncured first tread rubber portion 23a and the tire raw member 21 is not flat, in order to attach the uncured rubber sheet 16 onto the outer peripheral surface of the tire raw member with no space, it is preferable to push the uncured rubber sheet 16 by using a push roll R2 pushing onto the top face 28a, a push roll R3 pushing onto the side face 26a and a push roll R4 pushing onto the outer peripheral surface 27a of the tire raw member 21.

After the formation of the uncured electrically conductive band 23b, the uncured second tread rubber portion 23c is formed by circumferentially winding the uncured continuous rubber ribbon 15 plural times as shown in FIG. 3(c). The uncured base tread layer 23 is completed through the aforementioned steps. Similarly, as shown in FIG. 4(a), the uncured first tread rubber portion 24a of the cap tread layer 24 is formed on the periphery of a tire raw member 21A consisting of the tire raw member 21 and the uncured base tread layer 23 by circumferentially winding the uncured continuous rubber ribbon 15 plural times, and then the uncured electrically conductive band 24b is formed by winding the thin high-conductive uncured rubber sheet 16 one time as shown in FIG. 4(b), and finally the uncured second tread rubber portion 24c is formed by circumferentially winding the uncured continuous rubber ribbon 15 plural times as shown in FIG. 4(c). In this case, it is important that the uncured electrically conductive band 24b in the uncured cap tread layer 24 is contacted with the uncured electrically conductive band 23b in the uncured base tread layer 23 over the full periphery to ensure the electric continuity.

Moreover, the thin high-conductive uncured rubber sheet 16 can be formed in a thin form by rolling through a calendar or the like. The thus formed elongate sheet may be directly fed from the calendar onto the tire raw member and wound therearound to form the uncured electrically conductive band, or once the rolled elongate sheet is reeled, it may be used by reeling off. Similarly, the uncured rubber ribbon 15 extruded through the extruder E may be reeled and then used by reeling off instead of the case that the uncured rubber ribbon 15 is directly taken out from the extruder E and wound on the tire raw member.

INDUSTRIAL APPLICABILITY

As seen from the above, according to the tire of the invention, the tread rubber is made of the low-conductive continuous rubber ribbon circumferentially wound plural times, and the electrically conductive band is made of the high-conductive thin annular rubber sheet, so that the tire uniformity is improved and the production is possible in the multi-size mixed production system. Also, the thickness of the electrically conductive band in the widthwise direction can be controlled to a minimum. Furthermore, the electrically conductive band is arranged so as to extend in the widthwise region ranging from a part of the top face of the first tread rubber portion to a part of the bottom face of the second tread rubber portion, so that the conductive path from the belt to the treading face can be surely formed at a low cost.

The invention claimed is:

1. A tire comprising at least one tread layer consisting of a tread rubber made of a low-conductive rubber and an electrically conductive band arranged in widthwise middle portion of the tread rubber and constituting at least a part of a conductive path from a belt to a treading face of a tread in which a first tread rubber portion of the tread rubber separated from a second tread rubber portion by the electrically conductive band is arranged so as to orient a side face thereof contacting with the electrically conductive band outward in the radial direction, and the electrically conductive band is made of a high-conductive thin annular rubber sheet and the high-conductive thin annular rubber sheet comprising a top part extending in a tire width direction on a top face of the first tread rubber portion, a bottom part extending in the tire width direction under a bottom face of the second tread rubber portion separated by the electrically conductive band and a middle part extending from an end of the top part in the width direction toward an end of the bottom part in the width direction, wherein the tread rubber is made of a low-conductive continuous rubber ribbon circumferentially wound plural times, and wherein at least two of the tread layers are arranged adjacent to each other inside and outside in the radial direction and the electrically conductive bands in the at least two of the tread layers are contacted with each other over the full periphery.

2. A tire according to claim 1, wherein the side face of the first tread rubber portion contacting with the electrically conductive band has an average inclination angle of 45-75° with respect to an equatorial plane of the tire.

3. A tire according to claim 1, wherein the inside tread layer is arranged as at least innermost layer in the radial direction.

4. A method of producing a tire comprising at least one tread layer consisting of a tread rubber made of a low-conductive rubber and an electrically conductive band and a belt arranged in an inner side of the at least one tread layer in a tire radial direction the method comprising circumferentially winding a continuous low-conductive uncured rubber ribbon plural times to form an uncured tread rubber, winding a thin high-conductive uncured rubber sheet on an outer periphery of a rotating, displacing tire raw member one time to form an uncured electrically conductive band, the tire raw member comprising the belt and wherein the electrically conductive band is made of a high-conductive thin annular rubber sheet, which is arranged in a widthwise middle portion of the tread rubber and constitutes at least a part of a conductive path from the belt to a treading face of a tread in which a first tread rubber portion of the tread rubber separated from a second tread rubber portion by the electrically conductive band is arranged so as to orient a side face thereof contacting with the electrically conductive band outward in the radial direction, and the electrically conductive band is made of a high-conductive thin annular rubber sheet comprising:

a top part extending on a top face of the first tread rubber portion, a bottom part extending under a bottom face of the second tread rubber portion separated by the electrically conductive band and a middle part extending from an end of the top part in the width direction toward an end of the bottom part in the width direction, wherein at least two of the tread layers are arranged adjacent to each other inside and outside in the radial direction and the electrically conductive bands in the at least two of the tread layers are contacted with each other over the full periphery.

5. A method according to claim 4, wherein the high-conductive uncured rubber sheet is formed by rolling in a calendar.

6. A tire comprising:

a base tread layer, wherein the base tread layer comprises:

a first base tread rubber portion made of a low conductive rubber and a second base tread rubber portion made of a low conductive rubber, wherein an electrically conductive base band is arranged in widthwise middle portion of the base tread rubber and comprises at least a part of a conductive path from an radially inner surface of the base tread layer to an radially outer surface of the base tread layer, in which the first base tread rubber portion is separated from the second base tread rubber portion by the electrically conductive base band and is arranged so as to orient a side face thereof contacting with the electrically conductive base band outward in the radial direction, and wherein the electrically conductive base band comprises a top part extending in a tire width direction on a top face of the first base tread rubber portion, a bottom part extending in the tire width direction under a bottom face of the second base tread rubber portion separated by the electrically conductive base band, and a middle part extending from an end of the top part in the width direction toward an end of the bottom part in the width direction, the middle part being inclined with respect to the top face of the first base tread rubber portion and the bottom face of the second base tread rubber portion; and a cap tread layer disposed outside of the base tread layer, wherein the cap tread layer comprises:

a first cap tread rubber portion made of a low conductive rubber and a second cap tread rubber portion made of a low conductive rubber, wherein an electrically conductive cap band is arranged in widthwise middle portion of the cap tread rubber and comprises at least a part of a conductive path from an radially inner surface of the cap tread layer to an radially outer surface of the cap tread layer, in which the first cap tread rubber portion is separated from the second cap tread rubber portion by the electrically conductive cap band and is arranged so as to orient a side face thereof contacting with the electrically conductive cap band outward in the radial direction, and wherein the electrically conductive cap band comprises a top part extending in a tire width direction on a top face of the first cap tread rubber portion, a bottom part extending in the tire width direction under a bottom face of the second cap tread rubber portion separated by the electrically conductive cap band, and a middle part extending from an end of the top part in the width direction toward an end of the bottom part in the width direction, the middle part being inclined with respect to the top face of the first cap tread rubber portion and the bottom face of the second cap tread rubber portion;

wherein the electrically conductive cap band is electrically connected to the electrically conductive base band and the middle part of the electrically conductive cap band is inclined in a direction opposite to a direction in which the middle part of the electrically conductive base band is inclined.

7. A method of producing a tire comprising a base tread layer, wherein the base tread layer comprises:

a first base tread rubber portion made of a low conductive rubber and a second base tread rubber portion made of a low conductive rubber, wherein an electrically conductive base band is arranged in widthwise middle portion of the base tread rubber and comprises at least a part of a conductive path from an radially inner surface of the base tread layer to an radially outer surface of the base tread layer, in which the first base tread rubber portion is separated from the second base tread rubber portion by the electrically conductive base band and is arranged so as to orient a side face thereof contacting with the electrically conductive base band outward in the radial direction, and wherein the electrically conductive base band comprises a top part extending in a tire width direction on a top face of the first base tread rubber portion, a bottom part extending in the tire width direction under a bottom face of the second base tread rubber portion separated by the electrically conductive base band, and a middle part extending from an end of the top part in the width direction toward an end of the bottom part in the width direction, the middle part being inclined with respect to the top face of the first base tread rubber portion and the bottom face of the second base tread rubber portion;

a cap tread layer disposed outside of the base tread layer, wherein the cap tread layer comprises:

a first cap tread rubber portion made of a low conductive rubber, a second cap tread rubber portion made of a low conductive rubber, wherein an electrically conductive cap band is arranged in widthwise middle portion of the cap tread rubber and comprises at least a part of a conductive path from an radially inner surface of the cap tread layer to an radially outer surface of the cap tread layer, in which the first cap tread rubber portion is separated from the second cap tread rubber portion by the electrically conductive band and is arranged so as to orient a side face thereof contacting with the electrically conductive cap band outward in the radial direction, and wherein the electrically conductive cap band comprises
- a top part extending in a tire width direction on a top face of the first cap tread rubber portion,
- a bottom part extending in the tire width direction under a bottom face of the second cap tread rubber portion separated by the electrically conductive cap band, and
- a middle part extending from an end of the top part in the width direction toward an end of the bottom part in the width direction, the middle part being inclined with respect to the top face of the first cap tread rubber portion and the bottom face of the second cap tread rubber portion;

wherein the electrically conductive cap band is electrically connected to the electrically conductive base band and the middle part of the electrically conductive cap band is inclined in a direction opposite to a direction in which the middle part of the electrically conductive base band is inclined; and a belt arranged in an inner side of the base tread layer in a tire radial direction, the method comprising:
- circumferentially winding a continuous low-conductive uncured rubber ribbon plural times to form the first base tread rubber portion and the second base tread rubber portion,
- winding a thin high-conductive uncured rubber sheet on an outer periphery of a rotating, displacing tire raw member one time to form the electrically conductive base band, the tire raw member comprising the belt,
- circumferentially winding a continuous low-conductive uncured rubber ribbon plural times to form the first cap tread rubber portion and the second cap tread rubber portion, and
- winding a thin high-conductive uncured rubber sheet on the outer periphery of the base tread layer one time to form the electrically conductive cap band.

* * * * *